(12) United States Patent
Dams et al.

(10) Patent No.: US 7,160,850 B2
(45) Date of Patent: Jan. 9, 2007

(54) COMPOSITIONS OF MONOMERIC SURFACTANTS

(75) Inventors: Rudolf J. Dams, Antwerp (BE); Michael S. Terrazas, Prescott, WI (US); Michael J. Sierakowski, Stillwater, MN (US); George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/027,410

(22) Filed: Dec. 30, 2004

(65) Prior Publication Data

US 2006/0148671 A1 Jul. 6, 2006

(51) Int. Cl.
*C11D 1/00* (2006.01)
*C11D 3/20* (2006.01)
*C11D 3/24* (2006.01)
*C11D 3/26* (2006.01)
*C11D 3/34* (2006.01)

(52) U.S. Cl. .................. 510/494; 510/499; 510/501; 510/505; 564/80

(58) Field of Classification Search .............. None
See application file for complete search history.

(56) References Cited

U.S. PATENT DOCUMENTS

| | | | |
|---|---|---|---|
| 2,803,615 A | 8/1957 | Ahlbrecht et al. |
| 3,423,234 A | 1/1969 | Heine |
| 3,442,664 A | 5/1969 | Heine |
| 3,492,394 A | 1/1970 | Heine |
| 3,787,351 A | 1/1974 | Olson |
| 3,906,027 A | 9/1975 | Muessdoerffer et al. |
| 3,919,295 A | 11/1975 | Wechsberg et al. |
| 4,167,639 A | 9/1979 | Billenstein et al. |
| 5,274,159 A | 12/1993 | Pellerite et al. |
| 5,342,986 A | 8/1994 | Pohmer et al. |
| 5,502,251 A | 3/1996 | Pohmer et al. |
| 5,688,884 A | 11/1997 | Baker et al. |
| 5,702,509 A | 12/1997 | Pellerite et al. |
| 5,874,616 A | 2/1999 | Howells et al. |
| 6,280,883 B1 | 8/2001 | Lamanna et al. |
| 6,514,493 B1 | 2/2003 | DeLeo et al. |

FOREIGN PATENT DOCUMENTS

| | | |
|---|---|---|
| EP | 1 225 187 | 7/2002 |
| EP | 1 225 188 | 7/2002 |
| EP | 1 329 548 | 7/2003 |
| EP | 1 369 453 | 12/2003 |
| GB | 2 218 097 | 11/1989 |
| WO | WO 01/30873 | 5/2001 |
| WO | WO 02/16306 | 2/2002 |
| WO | WO 03/089712 | 10/2003 |
| WO | WO 2004/013225 | 2/2004 |

OTHER PUBLICATIONS

E. Kissa, "Flourinated Surfactants", *Surfactants Science Series*, vol. 50, Marcel Dekker, NY (1994).
Terrazas et al., U.S. Appl. No. 11/026,706, "Flourochemical Polymeric Surfactants", filed Dec. 30, 2004.
Dams et al., U.S. Appl. No. 11/027,404, "Compositions Containing C4-Swallow Tail Silanes", filed Dec. 30, 2004.

*Primary Examiner*—Gregory R. Del Cotto

(57) ABSTRACT

Described are monomeric fluorosurfactants having two perfluoro-lower-alkyl sulfonamido segments which are more efficient and effective in lowering the surface tension of organic solvents and water compared to other C4-based fluorosurfactants.

10 Claims, No Drawings

COMPOSITIONS OF MONOMERIC SURFACTANTS

FIELD OF THE INVENTION

The invention relates to novel fluorosurfactants derived from short chain perfluoroalkylsulfonyl fluoride where the surfactant contains two short chain perfluoroalkylsulfonyl groups. The surfactants have been found to be more efficient and effective in lowering the surface tension of organic solvents and water, compared to environmentally sustainable single tail C4-based fluorosurfactants.

BACKGROUND OF THE INVENTION

Fluorosurfactants are known and described generally in "Fluorinated Surfactants" by E. Kissa, Surfactants Science Series, Vol. 50 (Marcel Dekker, New York 1994). Fluorosurfactants including those derived from C4 perfluoroalkyl groups are also described in U.S. Pat. Nos. 4,167,639, 3,906,027, 5,342,986 and 5,502,251. In particular, fluorochemical surfactants derived from nonafluorobutanesulfonyl fluoride (PBSF) have been described more recently in WO 01130873 stating that the PBSF derived surfactants are almost as effective as the known premier surfactants derived from perfluorooctanesulfonyl fluoride (POSF). Furthermore, such surfactants have been described as more environmentally friendly. There remains a need to improve on the effectiveness and efficiency of such PBSF-derived fluorosurfactants.

SUMMARY OF THE INVENTION

We have found that monomeric fluorochemical surfactants having two shorter perfluoroalkyl segments (tails) in proximity to one another, preferably those derived from perfluorobutanesulfonyl fluoride (PBSF), are more effective and efficient in lowering the surface tension of organic solvents and water, compared to other single PBSF derived surfactants. They are also more economical to make.

The surfactants of the invention can be used as additives to paints, lacquers, inks, coating, fire fighting agents and the like. They may also provide superior leveling and wetting of floor finish coatings.

The surfactants of the invention are substantially free of fluorochemical compound that eliminate slowly from living organisms and are therefore considered environmentally sustainable versus most other known commercially available materials which are based on surfactants containing longer perfluorinated segments or tails.

Many previously known fluorochemical materials contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired surfactant properties, and which eliminate more effectively from the body (including the composition and its degradation products).

It is expected that the fluorochemical materials of the present invention, which contain perfluorobutyl moieties, when exposed to biologic, thermal, oxidative, hydrolytic, and photolytic conditions found in the environment, will break down to various degradation products. For example, compositions comprising perfluorobutylsulfonamido moieties are expected to degrade, at least to some extent, ultimately to perfluorobutylsulfonate salts. It has been surprisingly found that perfluorobutylsulfonate, tested in the form of its potassium salt, eliminates from the body much more effectively than perfluorohexylsulfonate and even more effectively than perfluorooctylsulfonate.

Accordingly, one aspect of the present invention provides a monomeric surfactant comprising one or more compounds of formula I:

wherein $R_f$ is a $C_2$–$C_5$ perfluoroalkyl group;
R is a $C_1$–$C_4$ alkyl or aryl group;
Q is a divalent linking group selected from —CHO—, —CHO($C_nH_{2n}$)—, —CHO($C_nH_{2n}$O)$_p$($C_nH_{2n}$)—, —CHS—, —CHS($C_nH_{2n}$)—, —CHS($C_nH_{2n}$O)$_p$($C_nH_{2n}$)— and —CHOC(O)($C_nH_{2n}$)—, in which p is an integer from 1 to 50; and
Z is —COO$^-$M$^+$, —SO$_3^-$M$^+$, —N$^+$(R)$_3$Y$^-$, —N(R)$_2$(CH$_2$)$_n$COO$^-$M$^+$, —N$^+$(R)$_2$(CH$_2$)$_n$SO$_3^-$, —(CH$_2$CH$_2$O)$_n$R', —(CH$_2$CH$_2$O)$_n$(CH(CH$_3$)CH$_2$O)$_z$R', or —PO$_3^{2-}$M$^{2+}$, in which n is an integer of 1 to 10, z is an integer from 0 to 10, and M is a hydrogen, metal ion, NH$_4$, or a protonated tertiary amine; R' is H or $C_nH_{2n+1}$; and Y is a halide or a carboxylate.

Another aspect of the invention is a surfactant composition including one or more compounds of formula I above defined in a solvent, which can be aqueous or organic.

A further aspect of the invention is a method of reducing the surface tension of a liquid by adding to said liquid a surfactant composition as above defined. Still another aspect of the invention is a method of improving the wetting of a coating mixture on a substrate by adding to the coating mixture a surfactant composition as, defined above.

A more detailed description of the present invention including particular embodiments is described hereinafter.

DETAILED DESCRIPTION OF ILLUSTRATIVE EMBODIMENTS

Compounds of the Invention

The present invention provides a monomeric surfactant including one or more compounds of the formula I:

wherein $R_f$ is a $C_2$–$C_5$ perfluoroalkyl group;
R is a $C_1$–$C_4$ alkyl or aryl group;
Q is a divalent linking group selected from —CHO—, —CHO($C_nH_{2n}$)—, —CHO($C_nH_{2n}$O)$_p$($C_nH_{2n}$)—, —CHS—, —CHS($C_nH_{2n}$)—, —CHS($C_nH_{2n}$O)$_p$($C_nH_{2n}$), and —CHOC(O)($C_nH_{2n}$)—, in which p is an integer from 1 to 50; and
Z is —COO$^-$M$^+$, —SO$_3^-$M$^+$, —N$^+$(R)$_3$Y$^-$, —N$^+$(R)$_2$(CH$_2$)$_n$COO$^-$M$^+$, —N$^+$(R)$_2$(CH$_2$)$_n$SO$_3^-$, —(CH$_2$CH$_2$O)$_n$R', —(CH$_2$CH$_2$O)$_n$(CH(CH$_3$)CH$_2$O)$_z$R', or —PO$_3^{2-}$M$^{2+}$, in which n is an integer of 1 to 10, z is an integer from 0 to 10, and M is a hydrogen, metal ion, NH$_4$, or a protonated tertiary amine; R' is H or $C_nH_{2n+1}$; and Y is a halide or a carboxylate.

Preferred surfactants of formula I are those where $R_f$ is $C_4F_9$—. Other preferred surfactants are those in which R is $CH_3$— or —$CH_2CH_3$. R may also be an aryl group such as phenyl which may be unsubstituted or substituted by up to five substituents including $C_{1-4}$ alkyl, $C_{1-4}$ alkoxy, halo, hydroxy, amino, nitro and the like. Preferred substituents are alkyl or halo, e.g. methyl, ethyl, fluoro, chloro, bromo or iodo.

In one particular aspect of the surfactant, the block copolymeric polyalkyleneoxy group, is of the formula A or B:

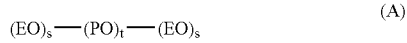

(A)

or

(B)

wherein p is an integer of 1 to about 20 and q is an integer of 0 to about 20.

Alternatively, another embodiment comprises a block copolymer group where the polyalkyleneoxy moiety is derived from a polyalkylene oxide of formula A where t is an integer of about 9 to about 15 and s is an integer of about 9 to about 20.

The above surfactant may also contain, if desired, a water-solubilizing polar group that may be anionic, non-ionic, cationic or amphoteric. Preferred anionic groups include, but are not limited to, sulfonates (e.g., —$SO_3M$), sulfates (e.g., —$OSO_3M$), and carboxylates (e.g., —C(=O)OM), wherein M is hydrogen, a metal cation such as an alkali or alkaline earth metal cation (e.g., sodium, potassium, calcium or magnesium, and the like), or a nitrogen-based cation, such as, for example, ammonium or a protonated tertiary amine (e.g. $(HOCH_2CH_2)_2N^{\oplus}HCH_3$).

The surfactants of formula I include embodiments where Y is a halide, e.g., fluoro, chloro, bromo, or iodo or a carboxylate, e.g., an anion of a carboxylic acid of 1–8 carbon atoms. Preferred hydrolysable groups, Y, are chloro, iodo or acetate.

M is a metal ion including alkali and alkaline earth metal ions, and specifically alkali metal ions such as lithium, sodium or potassium. M may also be an ammonium or a protonated tertiary amine, such as, for example triethyl ammonium, methyldiethyl ammonium and trimethyl ammonium.

The surfactants of formula I include embodiments where the linking group Q is —CHO— or —CHOCH$_2$—. Particularly useful compounds of formula I are $(C_4F_9SO_2N(CH_3)—CH_2)_2$—CHO $CH_2COO^-K^+$, $(C_4F_9SO_2N(CH_3)CH_2)_2$—CHO$(CH_2CH_2O)_7CH_3$, the triethanolamine salt of $(C_4F_9SO_2N(CH_3)CH_2)_2$ CHOPO$_3H_2$, and the ammonium salt of $(C_4F_9SO_2N(CH_3)CH_2)_2$ CHOSO$_3$H.

Methods of Use

The surfactants of the present invention have similar beneficial properties and can be used for the same purposes as the single group perfluorobutanesulfonamido surfactants and the premier surfactants, such as a corresponding perfluorooctanesulfonamido surfactant. Surprisingly, the surfactants of the present invention are more efficient and effective in lowering the surface tension of organic solvents and water than other environmentally sustainable C4-based fluorosurfactants. Similary, the surfactants of the present invention can improve the wetting of a liquid or coating mixture on a substrate to an extent comparable to the other fluorosurfactants.

The surfactants of this invention can be used individually or in combination to produce the desired surface tension reduction or wetting improvement Fluorochemical surfactants of the present invention have been found to be surprisingly effective in a number of applications.

Thus, for example the fluorochemical surfactants of the present invention are used as coating additives to provide better wetting of the coating to a substrate surface, or better wetting of a component within the coating formulation, for example, enhancing the wetting characteristics of a thickening agent. When used in water borne coatings, the fluorochemical surfactants are formulated into an aqueous solution or dispersion at a final concentration of about 0.001 to about 0.1 weight percent based on the weight of the solution or dispersion. The formulated product can be used in many coating applications such as floor polishes and finishes, varnish for a variety substrates, including wood floors, water borne gel applied in the manufacture of photographic film, automotive topcoats, and marine coatings. The fluorochemical surfactants can be used in other protective thin layer coatings as well, by preparing a formulation containing a surfactant, a powder, or a liquid mixture with organic solvents, fillers, and resins, including but not limited to epoxies, urethanes, acrylics, and the like. Typically, the surfactant concentration is about 0.1 to about 0.5 weight percent based on the weight of the formulation. Specific uses for these protective coatings include, for example, corrosion resistance coatings on electronic components for the computer and telecommunications industry, signage, office brushing, spraying, flow coating, and the like. The coatings are typically applied, dried, and cured, leaving the finished product with a solid coating. As an example, the surfactants have been found to be extremely effective in providing smooth clear polyurethane coatings without coating defects on surfaces that are difficult to wet, such as oily surfaces In still other applications, the fluorochemical surfactants of the present invention can be used as wetting agents or additives in photoresists, developers, and cleaning solutions in the manufacture of electronic materials. When used in photoresists, the surfactants provide a dramatic decrease in defect densities. The surfactant is mixed in a solvent solution to a final concentration of about 0.01 to about 0.1 weight percent based on the weight of the solution, and the mixture is coated onto electronic parts, typically by spin coating. For example, the mixture is dropped onto a wafer while it is spinning, forming an even coating on the wafer. In subsequent processing, a portion of the coating on the wafer is stripped with alkaline cleaners, etched with strongly oxidizing gases, or removed with solvents such as acetone. The remaining coating is cured on the article. When used in developer and cleaning solutions, the fluorochemical surfactant enables removal of contaminants from microchannels, which affects resolution and is critical to device operation. The surfactants provide low surface energy and chemical/thermal stability, allowing smaller critical dimensions (increased resolution) in the product as well as improved processor speeds and manufacturability. The fluorochemical surfactant is mixed in an aqueous solution to a final concentration of about 0.005 to about 0.5 weight percent based on the weight of the developer or cleaning solution. The mixture is transferred to a bath, and the electronic parts are either dipped or run through the bath on a conveyor belt.

In a further application, the fluorochemical surfactants of the present invention are useful in hard surface cleaning solutions to provide improved wetting of the hard surface and the contaminants to be removed. A cleaning solution is formulated to include about 0.005 to about 0.5 weight percent surfactant based on the weight of the cleaning solution. The cleaning solution is placed in a dispensing container such as a spray bottle or refill container for the spray bottle. Upon use, the cleaning solution is sprayed or otherwise applied to a hard surface such as window glass, a mirror, or ceramic tile, and the surface is wiped clean with a paper or fabric wipe.

In yet another application, the fluorochemical surfactants of the present invention are useful to enhance the wetting characteristics of thickening agents to form gels for solidifying or encapsulating medical waste. The surfactant is mixed with ethanol and applied to partially neutralized polyacrylic acid resin, typically having an average particle size of about 500 to about 800 microns. Other ingredients may be added to eliminate biological hazards and transform biological waste into non-hazardous waste. The ethanol is evaporated and the treated resin (about 0.5 to about 1.5 percent by weight surfactant based on the weight of the resin) in powder form is packaged and ready for use. The resulting product may be used in a variety of ways, including absorption of biological fluids generated, for example, in an operating room, and encapsulation of sharps generated in a host of medical procedures. The powder can be added to biological fluids that wet the resin particles, causing gelation to occur. The sharps can be placed in a container, for example, containing the powder, and when water is added the powder gels around the sharps. In both instances, the container is disposed of as a solid non-hazardous waste.

The fluorochemical surfactants of the present invention may be used as leveling additives for various resist inks for electronics and semiconductors, for inks such as gravure coat, screen print and thermal print, for adhesive layer for Wafer polishing and Wafer CMP solutions, for hard coats for plastic lenses, and for lubricant spray coatings. The surfactants may be used as leveling or wetting additives for films such as film condenser, microfilm, medical X-ray film, and APS film. The surfactants of the invention may also be used as wetting and lubricant additives for urethane, epoxy, acrylic, polyimide, and other materials, as foam blowing additives, as finishing additives for dry cleaning, as a leveling additive for pen ink, as thickening/oil barrier additives for grease coatings and grease/PTFE lubricants, and as leveling or wetting additives for green house film.

The above applications are not meant to be limiting but only exemplary. The following section provides working examples that describe in particular and by way of illustration the present invention. These working examples are provided as illustrative and are not to be deemed to be limiting on the invention.

EXAMPLES

Glossary

| Designator | Name, Formula and/or Structure | Availability |
| --- | --- | --- |
| 1,3-dichloro-2-propanol | $ClCH_2CH(OH)CH_2Cl$ | Sigma Aldrich |
| 4-dimethylaminopyridine | | Sigma Aldrich, Milwaukee, WI |
| Propane sultone | | Sigma Aldrich |
| Succinic anhydride | | Sigma Aldrich |

All "NEOCRYL" resins were obtained from Fitz Chem Corp., Itasca, Ill.

All "JONCRYL" resins were obtained from Johnson Polymer, Inc., Sturtevant, Wis.

Surface Tension Measurement

Surface Tension was measured using a Kruss K10ST tensiometer (mN/m; @ 25° C.), available from Kruss GmbH, Hamburg, Germany.

Preparation of $[C_4F_9SO_2N(CH_3)CH_2]_2CHOH$

A three-necked round bottom 1000 mL flask, fitted with a stirrer, heating mantle, condenser, nitrogen inlet, Dean-Stark trap and thermometer was charged with $C_4F_9SO_2N(CH_3)H$ (313.0 g; 1 mole), dimethylformamide (100.0 g) and heptane (40.0 g). The mixture was heated at reflux and dried by azeotropic distillation. The mixture was cooled to about 30° C. under nitrogen purge, and $NaOCH_3$ (30% in methanol; 180.0 g 1 mole) was added. The mixture was heated at 50° C. for one hour, stripping off methanol under vacuum from an aspirator. 1,3-Dichloro-2-propanol (65.0 g; 0.5 mole) was added to the flask and the temperature was elevated to 80° C. and held overnight. The ensuing mixture was washed with DI water (300 mL at 80° C.) three times and the remaining organic layer was separated and dried in an oven at 120° C. for 1 hour. Analysis of the resulting yellow brown solid was consistent with a mixture containing $[C_4F_9SO_2N(CH_3)CH_2]_2CHOH$ and $C_4F_9SO_2N(CH_3)CH_2CH(OH)CH_2Cl$ as a major components. Vacuum distillation at 150–180° C. (at 0.1 mm Hg) yielded $[C_4F_9SO_2N(CH_3)CH_2]_2CHOH$ (250.0 g).

Example 1

Preparation of $[C_4F_9SO_2N(CH_3)CH_2]_2CHOPO_3H_2$ Salt

A three-necked round bottom 500 mL flask, fitted with a condenser, stirrer, nitrogen inlet, Dean-Stark trap, cooler and thermometer was charged with $[C_4F_9SO_2N(CH_3)CH_2]_2$ CHOH (34.1 g; 0.05 mole) and toluene (40.0 g). The mixture was heated and dried via azeotropic distillation of toluene using the Dean-Stark trap, then cooled to 30° C. under a nitrogen purge and $POCl_3$ (7.7 g; 0.05 mole) was added. The mixture was heated at 80° C. for four hours and water (1.8 g; 0.10 mole) was added. The mixture was further heated at 80° C. overnight. The next morning toluene was removed under aspirator vacuum and isopropanol (40.0 g), DI water (20.0 g) and triethanolamine (sufficient to achieve a pH of 7.5) were added. A clear solution contaiing the fluorochemical surfactant salt of $[C_4F_9SO_2N(CH_3)CH_2]_2$ $CHOPO_3H_2$ and triethanolamine was obtained.

Example 2

Preparation of $[C_4F_9SO_2N(CH_3)CH_2]_2CHOSO_3H$ Salt

The procedure described in Example 1 was followed with the exception that propane sultone (6.1 g; 0.05 mole) was substituted for $POCl_3$ and the ensuing mixture was heated at 80° C. for three hours instead of four hours prior to water addition. Additionally, $NH_4OH$ (30% aqueous; 6.0 g) was substituted for triethanolamine.

Example 3

Preparation of $[C_4F_9SO_2N(CH_3)CH_2]_2CHO(CH_2CH_2O)_7OCH_3$

The procedure described in Example 1 was followed with the exception that after azeotropic distillation, $NaOCH_3$ (30% solution in methanol; 8.1 g; 0.05 mole) was added and reacted for 2 hours at 60° C. under a nitrogen purge. Methanol was removed under vacuum and $Cl(CH_2CH_2O)_7CH_3$ (18.8 g; 0.05 mole) was added and the ensuing mixture was heated at 80° C. overnight. The reaction mixture was filtered after reaction.

Example 4

Preparation of $[C_4F_9SO_2N(CH_3)CH_2]_2CHOCH_2COOK$

A three-necked round bottom 500 mL flask, fitted with a condenser, stirrer, nitrogen inlet, cooler and thermometer was charged with $C_4F_9SO_2NH(CH_3)$ (31.3 g; 0.10 mole), epichlorohydrin (4.7 g; 0.05 mole) and NaOH (50%; 0.05 mole equivalent). To this solution was added $NaOC(CH_3)_3$ (4.8 g; 0.05 mole) and temperature was held at 50° C. for 1 hour. $BrCH2COOCH2CH3$ (8.3 g; 0.05 mole) was added and the temperature was lowered to 30° C. and held overnight. The next morning the resulting ester was hydrolyzed with KOH/DI water/ethanol mixture, then acidified with HCl (95%) and washed with water. The ensuing free crude free acid was neutralized with KOH yielding $[C_4F_9SO_2N(CH_3)CH_2]_2CHOCH_2COOK$, collected by filtration as a white powder. A sample of this material was recrystallized from toluene to yield a white powder (mp 104–107.5°).

Example 5

Preparation of $[C_4F_9SO_2N(CH_3)CH_2]_2CHOC(O)C_2H_4COOH$

A 250 mL three necked round bottom was charged with $[C_4F_9SO_2N(CH_3)CH_2]_2CHOH$ (6.8 g; 10 mmole), succinic anhydride 1.0 g; 10 mmole) 4-dimethylaminopyridine (0.1 g) and toluene (100 mL). The ensuing mixture was stirred at 100° C. overnight, the toluene removed using a rotary evaporator, leaving a white solid residue that was triturated with toluene-hexane to yield $[C_4F_9SO_2N(CH3)CH_2]_2CHOC(O)C_2H_4COOH$ (5.2 g)

TABLE 1

Surface Tension

| Example | Concentration of Surfactant (% wt) | Surface Tension (mN/m) |
|---|---|---|
| 1 | 0.1 | 19.2 |
| 1 | 0.01 | 22.8 |
| 1 | 0.001 | 50.7 |
| 2 | 0.1 | 19.4 |
| 2 | 0.01 | 26.7 |
| 2 | 0.001 | 49.2 |
| 3 | 0.1 | 20.7 |
| 3 | 0.01 | 28.2 |
| 3 | 0.001 | 44.9 |
| 4 | 0.1 | 18.4 |
| 4 | 0.01 | 25.9 |
| 4 | 0.001 | 38.7 |

Addition of Surfactants to Waterborne Industrial Coatings $[C_4F_9SO_2N(CH_3)CH_2]_2CHOCH_2COOK$ was added (at 0.1% and 0.3%) to various waterborne industrial resins and the surface tensions of the ensuing mixtures were determined (see Table 2). Control values of the surface tensions of the resins without surfactant are also listed.

TABLE 2

Surface tensions (mN/m) for Example 4 (at 0.1% and 0.3%) in several commercially available waterborne industrial resins.

| Resin | Control (no surfactant added) | Example 4 | |
|---|---|---|---|
| | | 0.1% | 0.3% |
| NeoCryl A-550 | 36.7 | 27.1 | 25.5 |
| NeoCryl A-6099 | 39.1 | 25.3 | 19.9 |
| NeoPac R-9699 | 48.9 | 20.0 | 18.3 |
| NeoRez R-941 | 43.1 | 20.1 | 18.8 |
| NeoRez R-9621 | 47.4 | 28.9 | 23.6 |
| NeoCryl A-6092 | 46.5 | — | — |
| NeoCryl A-6044 | 29.2 | 25.8 | 23.8 |
| JONCRYL 537 | 37.4 | 21.3 | 20.9 |
| JONCRYL 1532 | 38.4 | 23.8 | 20.6 |
| JONCRYL 1925 | 41.0 | 22.9 | 21.5 |
| JONCRYL 1972 | 38.9 | 24.3 | 21.0 |

— indicates not measured

Additionally, "ZONYL FSP" and "ZONYL FSN" were added (at 0.1% and 0.3%) to various waterborne industrial resins and the surface tensions of the ensuing mixtures were determined (see Table 3).

Table 3. Surface tensions (mN/m) for Comparative Surfactants "ZONYL FSP" and "ZONYL FSN" (at 0.1% and 0.3%) in several commercially available waterborne industrial coatings.

| Resin | "ZONYL FSP" 0.1% | "ZONYL FSP" 0.3% | "ZONYL FSN" 0.1% | "ZONYL FSN" 0.3% |
|---|---|---|---|---|
| NeoCryl A-550 | 33.5 | 21.0 | 29.5 | 26.8 |
| NeoCryl A-6099 | 21.4 | 22.9 | 28.9 | 26.1 |
| NeoPac R-9699 | 26.0 | 21.7 | 25.6 | 23.4 |
| NeoRez R-941 | 26.2 | 18.8 | 25.1 | 24.4 |
| NeoRez R-9621 | 18.6 | 20.9 | 26.8 | 24.2 |
| NeoCryl A-6092 | 34.4 | 27.3 | 40.8 | 33.2 |
| NeoCryl A-6044 | 19.0 | 18.7 | 25.5 | 23.5 |
| JONCRYL 537 | 22.9 | 17.4 | 30.3 | 25.6 |
| JONCRYL 1532 | 24.0 | 18.5 | 28.7 | 26.9 |
| JONCRYL 1925 | 20.6 | 18.4 | 26.5 | 25.4 |
| JONCRYL 1972 | 31.6 | 22.8 | 28.9 | 26.3 |

"ZONYL FSP" and "ZONYL FSN" are trade designations of DuPont, Wilmington, Del.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A surfactant composition comprising one or more compounds of the formula:

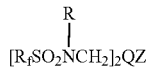

[R$_f$SO$_2$NCH$_2$]$_2$QZ wherein R$_f$ is a C$_2$–C$_5$ perfluoroalkyl group;
R is a C$_1$–C$_4$ alkyl or aryl group;
Q is a divalent linking group selected from —CHO—, —CHO(C$_n$H$_{2n}$)—, —CHO(C$_n$H$_{2n}$O)$_p$(C$_n$H$_{2n}$)—, —CHS—, —CHS(C$_n$H$_{2n}$)—, —CHS(C$_n$H$_{2n}$O)$_p$(C$_n$H$_{2n}$)—, and —CHOC(O)(C$_n$H$_{2n}$)—, in which p is an integer from 1 to 50; and
Z is —COO$^-$M$^+$, —SO$_3^-$M$^+$, —N$^+$(R)$_3$Y$^-$, —N$^+$(R)$_2$(CH$_2$)$_n$COO$^-$M$^+$, —N$^+$(R)$_2$(CH$_2$)$_n$SO$_3^-$, —(CH$_2$CH$_2$O)$_n$R', —(CH(CH$_3$(CH$_2$O)$_z$R', or —PO$_3^{2-}$M$^{2+}$, in which n is an integer of 1 to 10, z is an integer from 0 to 10, and M is a hydrogen, metal ion, NH$_4$, or a protonated amine; R' is H or C$_n$H$_{2n+1}$; and Y is a halide or a carboxylate.

2. A composition according to claim 1, wherein R$_f$ is C$_4$F$_9$—.

3. A composition according to claim 2, wherein R is —CH$_3$ or —CH$_2$CH$_3$.

4. A composition according to claim 3, wherein Y is Cl$^-$, I$^-$ or acetate.

5. A composition according to claim 2, wherein Q is —CHO— or —CHOCH$_2$—.

6. A composition according to claim 5 and of the formula (C$_4$F$_9$SO$_2$N(CH$_3$)—CH$_2$)$_2$—CHO CH$_2$COO$^-$K$^+$.

7. A composition according to claim 5 and of the formula:

(C$_4$F$_9$SO$_2$N(CH$_3$)CH$_2$)$_2$—CHO(CH$_2$CH$_2$O)$_7$CH$_3$.

8. A method of reducing the surface tension of a liquid comprising adding to said liquid a surfactant composition according to claim 1.

9. A method of reducing the surface tension of a liquid comprising adding to said liquid a surfactant composition according to claim 2.

10. A method of improving the wetting of a coating mixture on a substrate comprising adding to the coating mixture a surfactant composition according to claim 1.

* * * * *

UNITED STATES PATENT AND TRADEMARK OFFICE
CERTIFICATE OF CORRECTION

PATENT NO. : 7,160,850 B2
APPLICATION NO. : 11/027410
DATED : January 9, 2007
INVENTOR(S) : Rudolf J. Dams It is certified that error appears in the above-identified patent and that said Letters Patent is hereby corrected as shown below:

First Page
Column 2, line 1, under "Other Publications", Delete ""Flourinated" and insert -- "Fluorinated --, therefor.
Column 2, line 3, under "Other Publications", Delete ""Flourochemical" and insert -- "Fluorochemical --, therefor.

Column 1
Line 24, delete "01130873" and insert -- 01/30873 --, therefor.

Column 2
Line 38, delete "as," and insert -- as --, therefor.
Line 64, delete "CH$_2$O)$_2$R'," and insert -- CH$_2$O)$_z$–R', --, therefor.

Column 4
Line 14, after "improvement" insert -- . --.
Line 50, after "oily surfaces" insert -- . --.

Column 7
Line 57, delete "BrCH2COOCH2CH3" and insert -- BrCH$_2$COOCH$_2$CH$_3$ --, therefor.
Line 67, delete "107.5°)." and insert -- 107.5°C.). --, therefor.

Column 8
Line 8, delete "1.0 g;" and insert -- (1.0 g; --, therefor.
Line 13, after "(5.2 g)" insert -- . --.

Column 10
Line 8, Claim 1, after "–(CH$_2$CH$_2$O)$_n$R'," delete "–(CH(CH$_3$(CH$_2$O)$_Z$R'," and insert -- –(CH$_2$CH$_2$O)$_n$(CH(CH$_3$)CH$_2$O)$_Z$R', --, therefor.

UNITED STATES PATENT AND TRADEMARK OFFICE
CERTIFICATE OF CORRECTION

PATENT NO. : 7,160,850 B2
APPLICATION NO. : 11/027410
DATED : January 9, 2007
INVENTOR(S) : Rudolf J. Dams It is certified that error appears in the above-identified patent and that said Letters Patent is hereby corrected as shown below:

Column 10 (cont'd)
Line 11, Claim 1, after "protonated" insert -- tertiary --.

Signed and Sealed this

Fourteenth Day of October, 2008

JON W. DUDAS
*Director of the United States Patent and Trademark Office*